W. P. MARBLE.
VALVE HANDLE.
APPLICATION FILED SEPT. 21, 1908.

944,099.

Patented Dec. 21, 1909.

Witnesses.
C. H. Garnett
J. Murphy

Inventor:
Walter P. Marble
by Jas. H. Churchill
Atty.

UNITED STATES PATENT OFFICE.

WALTER P. MARBLE, OF CAMBRIDGE, MASSACHUSETTS.

VALVE-HANDLE.

944,099.      Specification of Letters Patent.      Patented Dec. 21, 1909.

Application filed September 21, 1908. Serial No. 454,012.

*To all whom it may concern:*

Be it known that I, WALTER P. MARBLE, a citizen of the United States, residing in Cambridge, county of Middlesex, and State of Massachusetts, have invented an Improvement in Valve-Handles, of which the following description, in connection with the accompanying drawings, is a specification, like letters on the drawings representing like parts.

This invention relates to a valve handle of that class in which the handle is detachably secured to the valve stem, and has for its object to provide a simple and efficient handle, which can be produced at the least possible cost.

To this end, the handle is composed of a non-metallic member, preferably wood, which is provided with a central hole or opening through it, and is further provided with inclined sockets which extend from said central opening, and a bushing of material hardened from a plastic condition, and preferably an alloy of soft metals, which fills the central opening in the non-metallic member and also the inclined sockets to form locking projections or arms which secure the said bushing to the non-metallic member.

The bushing referred to, is provided with an opening for the reception of the upper end of the valve stem, and may be provided with a flange which overlaps the walls of the central opening in the non-metallic member and coöperates with the locking arms in the inclined sockets to assist in firmly securing the bushing to the non-metallic member.

Figure 1:
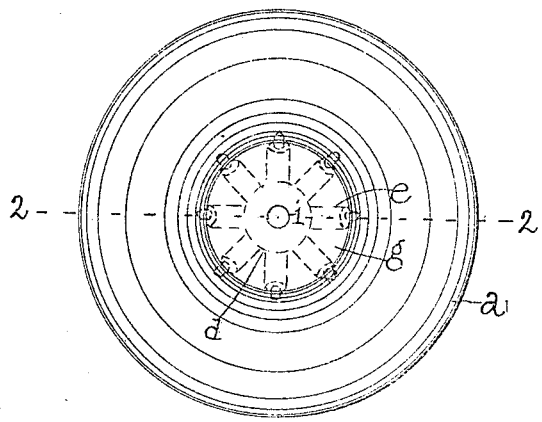
Figure 2:
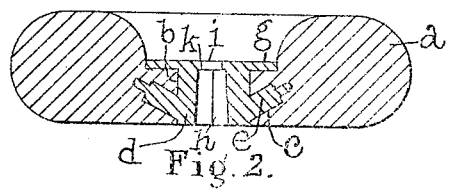

Figure 1 is a plan view of a handle embodying this invention, and Fig. 2, a section on the line 2—2, Fig. 1.

Referring to the drawing, $a$ represents the non-metallic member or handle proper, which is preferably made of wood. The member $a$ is provided with a central hole or opening $b$ extended through it and which is represented of uniform diameter throughout its length, and from which extend inclined sockets $c$, which are formed by inserting a suitable drill through one end of the central opening $b$.

The non-metallic member is provided with a bushing $d$ of a material, which hardens from a plastic state and preferably an alloy of soft metal, which is poured into the central opening and fills the same and also the inclined sockets $c$ to form locking arms $e$ integral with the bushing intermediate the ends of the same.

The bushing $d$ may be provided at one end with a flange $g$, which is integral with it and overlaps one end of the wall of the central opening $b$, said flange coöperating with the inclined locking arms $e$ to resist movement of the handle longitudinally on the bushing $d$.

The bushing $d$ is provided with an opening $h$ angular in cross section for the reception of the upper end of the valve stem, not shown, and may also be provided with a round hole $i$ in the end wall $k$ of the opening $h$, for the passage through it of the threaded end of the valve stem of some constructions of the latter, which are not herein shown.

The hole $i$ is of smaller diameter than the opening $h$, so that the walls $k$ of the hole $i$ form an internal flange on the bushing, which affords a bearing for the head of a screw when the latter is used and inserted into a socket in the valve stem, and which also assists the out-turned flange $g$ in affording a bearing for the nut on the threaded end of the valve stem when the latter is used.

The out-turned flange $g$ forms a washer for the hexagonal or other shaped nut and prevents the corners of the nut cutting into the wood when the nut is set up hard to pull the tapered stem to its seat, and both flanges $g$, $k$ serve as locking means to retain the nut on the threaded stem or the headed screw in its socket in the stem, when the bushing and its flanges $g$, $k$, are made of an alloy of metals, because of the yielding or soft nature of the alloy, which has a certain spring action when compressed by the nut or screw being set up hard. As a result, the nut or the headed screw is retained in firm engagement with the valve stem and the liability of either working loose is reduced to a minimum.

By reference to Fig. 2, it will be seen that a portion of the wooden handle is interposed between the locking arms $c$ and the flange $g$, with the result, that the bushing and handle are practically locked against longitudinal movement of one with relation to the other.

I may prefer to provide the bushing $d$ with the flange $g$, but I do not desire to limit my invention in this respect, as the locking arms $e$ alone may be depended upon to secure the handle proper *a* to the bushing against rotary or longitudinal movement.

The valve handle herein shown is designed and adapted to meet the demand for a handle of the least possible cost, which will enable inexpensive valves to be provided with a superior non-metallic handle, which is capable of being firmly secured to the valve stem.

I may prefer to make the bushing *d* of an alloy of soft metals, but I do not desire to limit my invention in this respect, as cement or like material may be used.

Claims.

1. A valve handle of the class described, comprising a non-metallic member having an opening through it and provided with sockets which incline away from one end of said opening into said non-metallic member, and a bushing of a material hardened from a plastic state filling the said opening and sockets to form locking arms in the latter, and provided at one end with a flange integral with it and overlapping the walls of the opening in the non-metallic member to coöperate with the locking arms in resisting longitudinal movement of the handle with relation to the bushing and to form a bearing surface for the nut, said bushing having an opening for the reception of the valve stem, substantially as described.

2. A valve handle of the class described, comprising a non-metallic member having an opening through it and provided with sockets, which incline away from one end of said opening into said non-metallic member, and a bushing of a material hardened from a plastic state filling the said opening and sockets to form locking arms in the latter, and provided with an opening for the reception of the valve stem and at one end with an inwardly extended flange integral with the bushing and forming a hole of smaller diameter than the opening into which the valve stem is seated, substantially as and for the purpose specified.

3. A valve handle of the class described, comprising a non-metallic member having an opening through it and provided with sockets, which incline away from one end of said opening into said non-metallic member, and a bushing of a material hardened from a plastic state filling the said opening and sockets to form locking arms in the latter, and provided with an opening for the reception of the valve stem and at one end with an outwardly extended flange integral with the bushing and overlapping the walls of the opening in the non-metallic member and having at the same end an inwardly extended flange integral with the bushing and forming a hole of smaller diameter than the opening in the bushing, substantially as and for the purpose specified.

In testimony whereof, I have signed my name to this specification in the presence of two subscribing witnesses.

WALTER P. MARBLE.

Witnesses:
    JAS. H. CHURCHILL,
    J. MURPHY.